United States Patent

Tentarelli

[11] Patent Number: 5,814,129
[45] Date of Patent: Sep. 29, 1998

[54] RADIAL FLOW ADSORPTION VESSEL

[75] Inventor: Stephen Clyde Tentarelli, Fogelsville, Pa.

[73] Assignee: Air Products and Chemical, Inc., Allentown, Pa.

[21] Appl. No.: 840,090

[22] Filed: Apr. 11, 1997

[51] Int. Cl.⁶ .................................................. B01D 53/04
[52] U.S. Cl. .................................. 95/90; 96/139; 96/151; 96/152; 210/266; 210/286
[58] Field of Search ................................. 96/108, 130, 139, 96/151, 152; 210/266, 282, 286; 95/90, 96

[56] References Cited

U.S. PATENT DOCUMENTS

| | | | |
|---|---|---|---|
| 2,181,672 | 11/1939 | Sutcliffe et al. | 96/139 X |
| 2,400,076 | 5/1946 | Dauster | 96/139 |
| 2,400,180 | 5/1946 | Venable | 96/139 |
| 2,557,557 | 6/1951 | Newcum | 96/152 X |
| 3,841,484 | 10/1974 | Domnick | 210/282 X |
| 4,048,073 | 9/1977 | Rose | 210/286 X |
| 4,541,851 | 9/1985 | Bosquain et al. | 55/208 |
| 4,946,485 | 8/1990 | Larsson | 96/152 |
| 5,106,501 | 4/1992 | Yang et al. | 210/282 X |
| 5,348,573 | 9/1994 | Tomassian et al. | 96/152 X |
| 5,593,475 | 1/1997 | Minh | 96/130 X |
| 5,632,802 | 5/1997 | Grgich et al. | 96/130 X |

FOREIGN PATENT DOCUMENTS

| | | | |
|---|---|---|---|
| 57158/90 | 12/1990 | Australia . | |
| 0820798 A2 | 1/1989 | European Pat. Off. . | |
| 0906958 | 2/1946 | France | 96/152 |
| 3204022 | 8/1983 | Germany | 96/108 |
| 3939518 | 6/1991 | Germany | 96/108 |
| 1281287 | 1/1987 | U.S.S.R. | 96/130 |
| 1683806 | 10/1991 | U.S.S.R. | 96/108 |

OTHER PUBLICATIONS

Dr. Ulrich von Gemmingen, "Desighns of adsorptive dryers in air separation plants," *Reports on Science and Technology*, 54/1994.

M. Granier et al., "Adsorption Purification For Air Separation Units," *Cryogenic Process and Equipment*, Book Number G00283, American Society of Mechanical Engineers, pp. 143–148 (1984).

Frank G. Kerry, "Front–Ends for Air Separation Plants—The Cold Facts," *Chemical Engineering Progress*, pp. 48–54 (Aug. 1991).

Johnson Filtration Systems, "Radial Flow Reactor Screen Internals," (date unknown).

*Primary Examiner*—Robert Spitzer
*Attorney, Agent, or Firm*—Willard Jones, II

[57] ABSTRACT

Apparatus and method to improve flow of fluid through an annular bed in a radial flow treatment vessel. An elongated annular baffle is disposed in the reactor adjacent the bed to impart generally U-shaped flow to the fluid either prior to entering or after it exits the bed thus achieving an overall serpentine or reverse U-shaped flow pattern as the fluid proceeds from an entry port to an exit port in the reactor. Means are provided in the baffle to permit minor amounts of fluid to bypass the generally U-shaped flow path in order to correct fluid flow maldistribution through the bed that is attributed to frictional pressure drop in the flow channels adjacent to the bed. A vessel according to the invention can be operated with fluid flow through the vessel in either direction.

10 Claims, 4 Drawing Sheets

RADIAL FLOW ADSORPTION VESSEL

BACKGROUND OF THE INVENTION

The present invention pertains to radial flow adsorption vessels of the type wherein gas flow through the vessel is in a generally U-shaped flow pattern, effected by having the inlet and outlet manifolds on the same end of the vessel.

Radial flow adsorption vessels have found particular use in a conventional cryogenic air separation plant where they are used as a front end purification system to remove certain unwanted contaminants from the feed air stream, prior to the feed air stream entering a cryogenic separation unit.

F. G. Kerry describes such systems in an article titled "Front-Ends for Air Separation Plants-The Cold Facts," Chemical Engineering Progress, August 1991. Other descriptions of the use of adsorption vessels in air separation plants are described in a paper titled "Adsorption Purification For Air Separation Units" by M. Grenier, J. Y. Lehman, P. Petit and D. V. Eyre, Cryogenic Process and Equipment, book number G00283, American Society of Mechanical Engineers (1984). Another description of air separation and the use of radial flow adsorbers is in an article by Dr. Ulrich von Gemmingen titled "Designs of Adsorptive Dryers in Air Separation Plants" Linde AG, Reports on Science and Technology (1994).

U.S. Pat. No. 4,541,851 discloses two different radial flow adsorption vessels. In a first vessel the flow configuration of gas through the adsorber is in the general configuration of a Z, wherein the introduction and removal of gas from the vessel are on opposite ends of an elongated, generally cylindrical vessel. The process fluid (gas) enters through a nozzle on one end (bottom nozzle), flows axially upwardly through an outer annulus in the vessel which contains the adsorptive material, then flows radially inward through the adsorbent material and a filter element and then into a center channel where it flows axially upward and out of the vessel through a nozzle on the top of the vessel, the vessel being oriented in a vertical direction. This embodiment of Patentees device permits reversal of the flow direction through the vessel. In another embodiment, Patentees describe a radial flow vessel where the inlet and outlet nozzles are located on the bottom of the vessel which is oriented in a generally upright position. Process fluid enters through one nozzle, flows axially upward through the outer annulus, flows radially inward through the adsorbent bed and into a center channel where it then flows axially downward and out of the vessel. Perforated walls define the flow channels which produce a generally U-shaped flow pattern as the fluid flows through the vessel.

In Australian Patent Application 57158/90, Applicants disclose a radial flow adsorption vessel wherein the flow pattern, from an inlet on one end of the vessel to an outlet located on the opposite end of the vessel, is in the general shape of a Z. The flow path through this vessel is similar to the first vessel discussed above in regard to the '851 patent. Applicants disclose a vessel wherein the process fluid enters through a bottom nozzle, flows axially upward in an outer annulus, flows radially through an adsorbent bed and a dust sieve element, and then into a center channel where it flows axially upward and out of the vessel through a nozzle located at the top of the vessel, the vessel being oriented in a generally vertical position.

Both the U.S. Patentees and Australian Applicants include a conical member in the central channel of the generally Z-shaped flow pattern vessel, to improve the uniformity of flow through the adsorbent bed, because the Z-flow manifolding technique (entrance and exit on opposite ends of the vessel) produces inherently poor flow distribution when compared to a U-shaped flow manifolding technique, given the dimensions typical of a radial flow adsorption vessel, for front-end systems. The conical member does not work for flow in both directions. It corrects maldistribution for flow in one direction, but worsens it for flow in the opposite direction.

In the prior art vessel utilizing a Z-shaped flow pattern the primary methods to reduce flow maldistribution with flow in both directions was to either increase the flow area in the internal channels, thus increasing the vessel size and the cost of the vessel, or to increase the pressure drop through the bed thus increasing the power cost to operate the process.

U.S. Filter/Johnson Screens, of St. Paul, Minn. offers radial flow reactor screens for radial flow vessels (reactors) that use a generally Z-shaped flow pattern for the process fluids.

BRIEF SUMMARY OF THE INVENTION

It has been discovered that by incorporation of generally cylindrical shaped internal baffles into a generally cylindrical shaped radial flow adsorption vessel, what was heretofore a generally Z-shaped flow pattern can be converted into a generally U-shaped flow pattern inside the vessel, while still permitting use of inlet and outlet nozzles on opposite ends of the vessel. In one embodiment of the invention the baffle is placed between an outer wall of the vessel and an inner annular shaped bed or beds of adsorbent, to impart a reverse U-shape or serpentine flow pattern to the process fluid as it is conveyed from the outer wall to the central conduit of the vessel. In another embodiment of the invention the baffle is incorporated between the adsorbent bed and the central longitudinal axis of the vessel, to impart the reverse U-shape or serpentine flow pattern to the process gas during its progression from the adsorption bed to the outlet nozzle of the vessel. In general, as used herein, the term U-Flow refers to the shape of the path of the fluid as it flows in the two flow channels which are adjacent to the bed and through the bed. It does not refer to the shape of the path of the fluid as it flows around the end of the baffle which is also U-shaped. The term 'reverse flow' refers to the reversal in the flow direction of the fluid as it flows around the end of the baffle.

A radial flow adsorption vessel according to the present invention can be operated with fluid flow in both directions, i.e. flow in the bottom and out the top or flow in the top and out the bottom. The method and apparatus of the invention permit correction of flow maldistribution for flow in both directions. Front end purification cycles require flow in both directions.

DETAILED DESCRIPTION OF THE INVENTION

Figure 1:
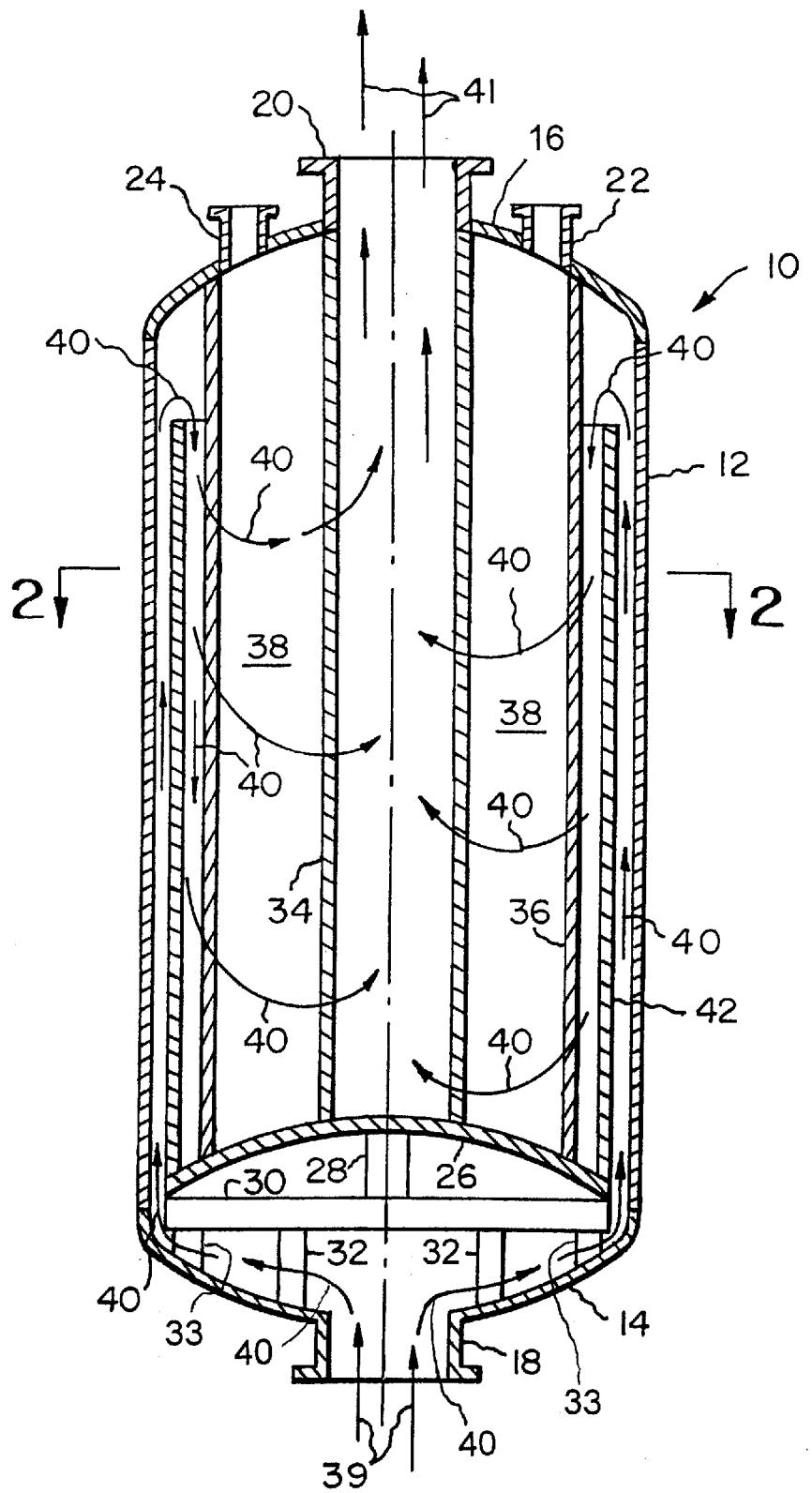
FIG. 1 is a longitudinal cross sectional view of a radial flow adsorption vessel according to one embodiment of the invention.

Referring to the drawings, FIG. 1 shows a vessel 10 according to the present invention. Vessel 10 has an outer shell 12, a first or bottom end 14 closed by a generally hemispherical head and a second or top end 16 which is also closed by a generally hemispherical head. First end 14 contains an inlet conduit or nozzle 18. Second end 16 contains an outlet conduit or nozzle 20.

Head 16 also includes fill-ports 22, 24 for introducing and removing adsorbent from the interior of the vessel 10, as will hereinafter be fully explained.

Disposed within the interior of vessel 10 is a rigid impervious suspended bottom 26 which is supported by a series of webs 28, 30 and supports 32, 33 as is well known in the art. Suspended bottom plate 26 supports a first concentric conduit 34 which communicates with the outlet nozzle 20. Disposed concentrically around and spaced apart from the central conduit 34 is a second cylindrical wall or a conduit 36 which defines annular space into which the adsorbent material can be placed via access ports 22, 24. Alternatively, the bottom plate 26 can be supported by central conduit 34 and cylindrical conduit 36. The walls of the central conduit 34 and the cylindrical conduit 36 are screen type constructions such as offered for sale by Johnson Filtration Systems to permit the flow of process fluid (gas) through the bed 38 as shown by arrows 40.

Disposed between the wall or screen 36 and the outer wall 12 of the vessel 10 and supported by bottom plate 26 is a flow directing baffle 42, which has a cylindrical shape. Baffle 42 serves to direct the process fluid, represented by arrows 39, entering the inlet nozzle 18 and arrows 40 inside the vessel, through a serpentine path that extends vertically along the outer wall 12 of the vessel 10 and then makes a generally U-shaped turn (reverse flow) over the baffle 42, extends down along the passage defined by baffle 42 and wall 36, passes through the adsorbent bed 38 into the central conduit 34, and exits vessel 10 through nozzle or outlet 20 as shown by arrows 41.

Figure 2:
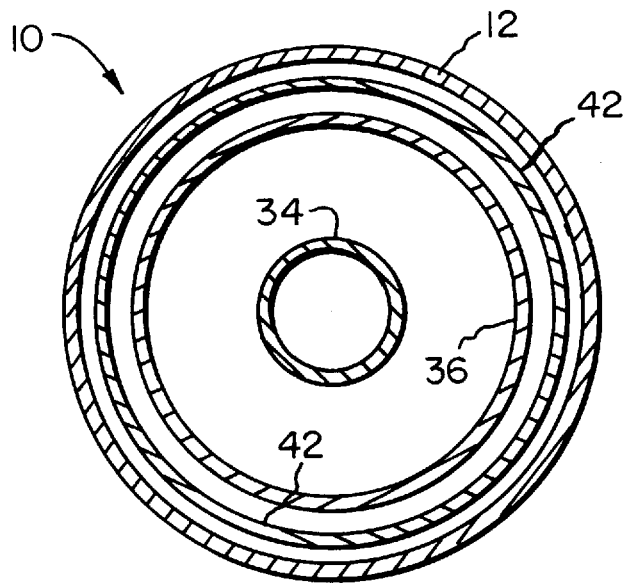
FIG. 2 is a view taken along lines 2—2 of FIG. 1.
Figure 4:
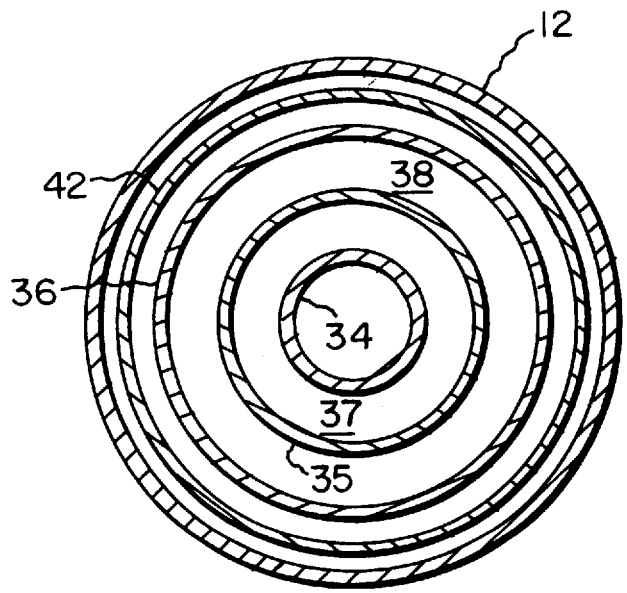
FIG. 4 is a cross sectional view of the vessel of FIG. 1 showing the placement of an additional annular adsorbent bed.

FIG. 4 is a cross sectional view similar to FIG. 2 except that a second internal wall or screen 35, having an annular configuration, is disposed between the central conduit 34 and screen 36 creating two distinct chambers 37 and 38 so that two different adsorbents can be placed in the vessel to treat the process fluid.

Figure 3:
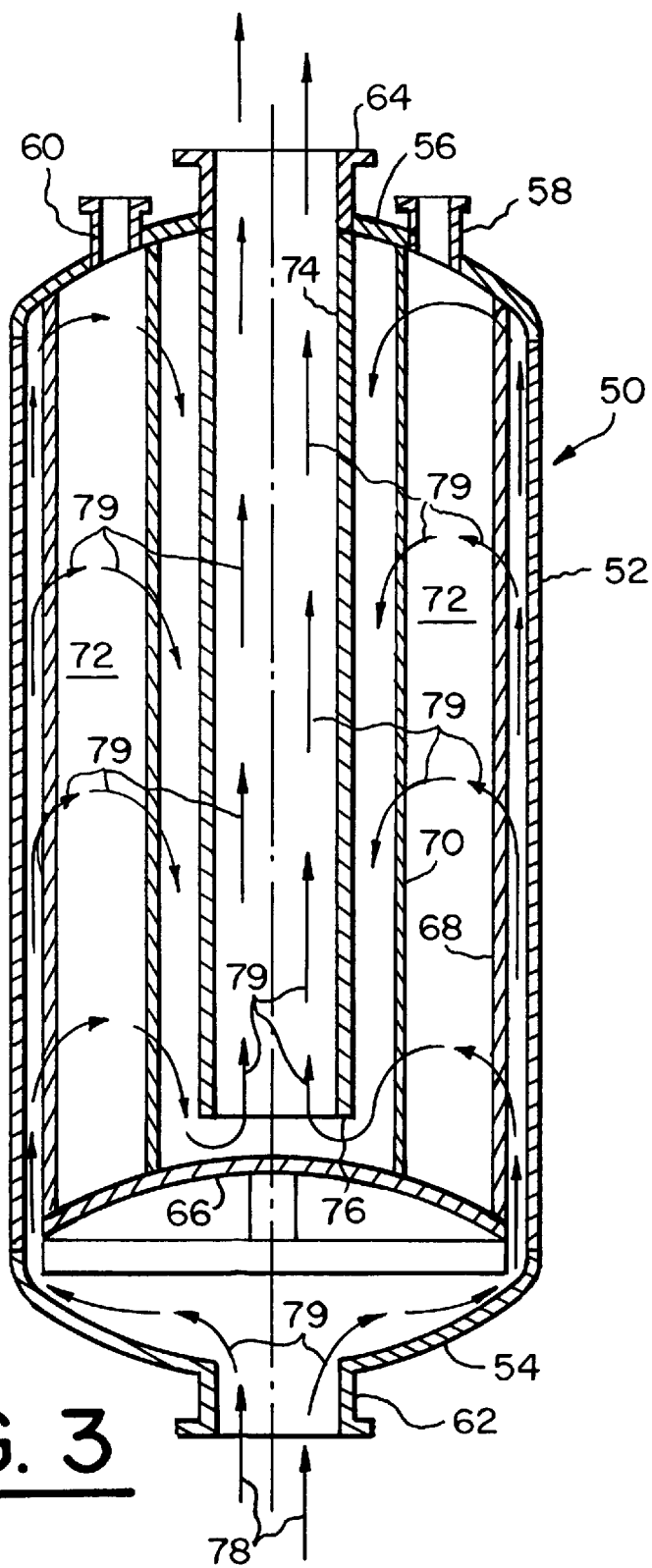
FIG. 3 is a longitudinal cross sectional view of a radial adsorption vessel according to a second embodiment of the present invention.

FIG. 3 discloses an alternate vessel 50 having an outer wall 52, first or bottom hemispherical end 54, and second or top hemispherical end 56, adsorbent fill and removal ports 58, 60, inlet conduit or nozzle 62 and outlet conduit or nozzle 64, all of which are similar to the device of FIG. 1. In a manner similar to the device of FIG. 1 a suspended bottom plate 66 is used to support concentric internal screens 68, 70 which define an annular adsorbent bed 72. Annular adsorbent bed 72 can be divided into a multiplicity of different adsorbent beds in a manner similar to that described in relation to FIG. 1.

Vessel 50 includes a central conduit or baffle 74, which extends from the second or exit nozzle 64 toward the suspended bottom 66 with end 76 of conduit 74 terminating in a manner to define a passage between the suspended bottom 66 and conduit or baffle 74. Arrows 78 show the process fluid entering the vessel 50, and arrows 79 show the path of the process fluid as it flows through the reactor 50. As shown in FIG. 3 the process fluid 78 entering the reactor flows upwardly along the outer wall 52 of the vessel 50, radially through the bed 72, and downwardly along the inner conduit 70 in a generally U-shaped flow pattern. Process fluid then flows around the bottom of the central conduit or baffle 74, reverses direction so that it flows axially upward through baffle 74 and is directed out of vessel 50 via nozzle 64. Thus, in a manner similar to the flow in FIG. 1 the process gas flows in a serpentine pattern through the vessel 50.

Figure 5:
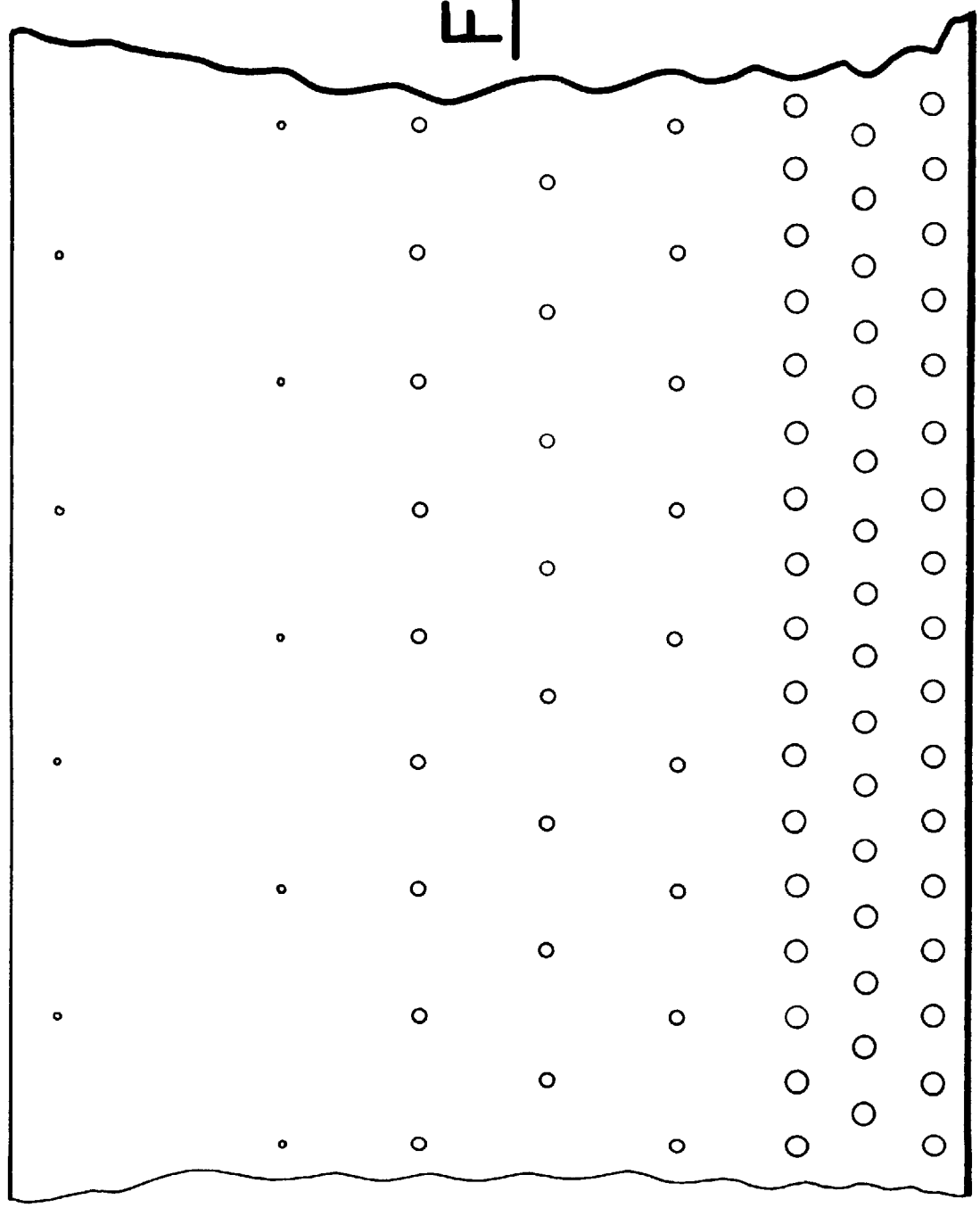
FIG. 5 is a fragmentary view of a portion of the wall of a baffle according to the present invention illustrating incorporation of flow by pass into the baffle.

FIG. 5 is a schematic representation of a portion of the wall of either the baffle 42 (FIG. 1) or the baffle 74 (FIG. 3) wherein means are included in the baffle to permit a small amount of by-pass flow through the baffle, to correct flow maldistribution which is caused by frictional pressure losses in the flow channels adjacent the adsorbent beds (i.e. the channel formed by central conduit 34 and the channel between screen 36 and baffle 42 in FIG. 1, or the channels between baffle 74 and screen 70, and between screen 68 and wall 52 in FIG. 3). In the case of FIG. 1, the means could be a series of small holes extending from the bottom toward the top of the baffle where the holes are larger and spaced closer at the bottom, and smaller and spaced further apart at the top of the baffle. The objective for this type of arrangement is to allow more by-pass flow through the bottom and less through the top of the baffle. One relationship between the holes is illustrated schematically in FIG. 5. When designed properly it is unlikely the by-pass flow will exceed 10% of the total flow in order to correct maldistribution caused by frictional pressure drop.

In the case of the device of FIG. 3 the larger holes would be at the top end of the baffle 74 adjacent the exit nozzle 64 progressing toward smaller and more spaced apart holes at the second or bottom end of 76 of the baffle 74, the intent being to allow more by-pass flow through the top and less through the bottom.

In either embodiment of the invention, the vessel can be oriented up-side-down from the way in which the orientation is shown in FIGS. 1 and 3. Orienting the vessels in this manner would require the fill-ports 22, 24, 58, 60 to be at the opposite end of the vessel.

Thus, according to the invention, a radial flow adsorption vessel is produced that has a U-flow manifolding arrangement, but with the inlet and outlet nozzles at opposite ends of the vessel. The concentric cylindrical baffle, outer-channel-baffle 42 of FIG. 1 and center-channel-baffle 74 of FIG. 3, causes the process fluid to reverse its axial flow direction as it proceeds through the vessel to achieve uniform distribution of flow through the adsorbent bed or beds.

The present invention achieves overall U-flow through the vessel, U-flow having better flow distribution than Z-flow, because a U-flow arrangement provides a means to balance the dynamic pressure in the flow channels on the sides of the bed, without requiring the inlet and outlet nozzles be at the same end of the vessel. Having the inlet and outlet nozzles at the same end of the vessel usually increases the cost of the reactor and the external piping connected to the vessel.

Having thus described my invention what is desired to be secured by letters patent of the United States is set forth in the appended claims.

What is claimed:

1. A method for imparting a generally U-shaped flow pattern to fluids flowing inside a vessel of the type having an elongated closed cylindrical housing having disposed there in at least one annular shaped bed of an adsorbent material said housing having means on one end for admitting fluid to said bed, and means on an opposite end of said vessel for removing fluid from, said bed, comprising:

installing means inside said vessel, said means imparting a generally U-shaped flow pattern to said fluid at one of, prior to said fluid entering said bed or after said fluid exits said bed, disposed at a location being one of between an outer wall of said housing and said bed or being a central conduit adapted to remove fluid from said vessel after passing through said bed with means provided in said baffle to permit a small amount of fluid flow through said vessel to by-pass said baffle;

whereby, fluid flow through said vessel from said means to introduce fluid into said bed to said means to remove said fluid from said bed is in a generally serpentine pattern.

2. A method according to claim 1 including installing a generally cylindrical baffle between an axis of rotation of said housing and said bed, said baffle directing fluid flowing through said bed along a path defined by said baffle and said bed of said housing and in a reverse direction along a path defined by said baffle to direct fluid flow out of said vessel.

3. A method according to claim 1 including introducing fluid into either end of said vessel and removing it from an opposite end of said vessel.

4. In a vessel of the type having a generally cylindrical elongated outer shell having first and second ends closed by end plates or heads, at least one annular shaped bed containing particulate material disposed longitudinally between said outer shell and a central axis of rotation of said shell, means on one end of said vessel to introduce a fluid into said vessel to pass through said bed and means on an opposite end of said vessel to remove said fluid from said vessel after passing through said bed, the improvement comprising:

means in said vessel to impart a generally U-shaped flow pattern to said fluid at one of, prior to said fluid entering said bed or after said fluid exits said bed, said means to impart said generally U-shaped flow pattern being a generally fluid impervious generally cylindrical baffle disposed on an impervious bottom plate supporting said annular bed and extending longitudinally along at least a major portion of said bed, said baffle defining a flow passage between itself and said outer wall of said vessel and between itself and said annular bed, wherein said flow pattern defines a flow path which includes means to permit a small portion of the fluid flow through said vessel to by-pass said baffle to correct flow maldistribution, which is attributed primarily to frictional pressure losses and unbalanced dynamic pressures in said flow passages adjacent to said bed, whereby, fluid flow through said vessel from said means to introduce fluid into said vessel to said means to remove said fluid from said vessel is in a generally serpentine pattern.

5. A vessel according to claim 4 wherein said means in said flow path to correct flow maldistribution includes passages through said baffle said passages permitting more bypass fluid at an end of said baffle opposite to an end of said baffle which causes said fluid flow to reverse its direction.

6. A vessel according to claim 4 wherein said means in said flow path to correct flow maldistribution is a series of apertures varying in size and/or spacing from said end of said baffle supported by said bottom plate to an opposite end of said baffle with the size of said apertures being larger and/or said spacing being closer at said end supported by said bottom plate, than at said opposite end of said baffle.

7. In a vessel of the type having a generally cylindrical elongated outer shell having first and second ends closed by end plates or heads, at least one annular shaped bed containing particulate material disposed longitudinally between said outer shell and a central axis of rotation of said shell, means on one end of said vessel to introduce a fluid into said vessel to pass through said bed and means on an opposite end of said vessel to remove said fluid from said vessel after passing through said bed, the improvement comprising:

means in said vessel to impart a generally U-shaped flow pattern to said fluid at one of before said fluid enters said bed or after said fluid exits said bed, said means to impart said generally U-shaped flow pattern is a generally fluid impervious concentric baffle disposed between said bed and said axis of rotation of said shell, and means to permit a small portion of the fluid flow through said vessel to by-pass said baffle to correct flow maldistribution, which is attributed primarily to frictional pressure losses and unbalanced dynamic pressures in said flow passages adjacent to said bed, whereby, fluid flow through said vessel from said means to introduce fluid to said means to remove said fluid from said vessel is in a generally serpentine pattern.

8. A vessel according to claim 7 wherein said generally cylindrical baffle extends along at least a major portion of said bed from said first end of said vessel toward said second end of said vessel, said baffle defining flow passages between itself and said axis of rotation and between itself and said annular bed.

9. A vessel according to claim 7 wherein said means in said flow path to correct flow maldistribution includes passages through said baffle used to define said flow path said passages permitting more bypass fluid at an end of said baffle opposite to an end of said baffle which causes said fluid flow to reverse its direction.

10. A vessel according to claim 9 wherein said passages include a series of apertures varying in size and/or spacing from said end of said baffle adjacent said top of said vessel to an opposite end of said baffle with said size of said apertures being larger and/or said spacing being closer at said end of said baffle adjacent said top of said vessel.

\* \* \* \* \*